June 19, 1928.
W. L. GILL ET AL
1,674,284
SEPARATOR FOR THE PLATES OF STORAGE CELLS
Filed Jan. 27, 1926
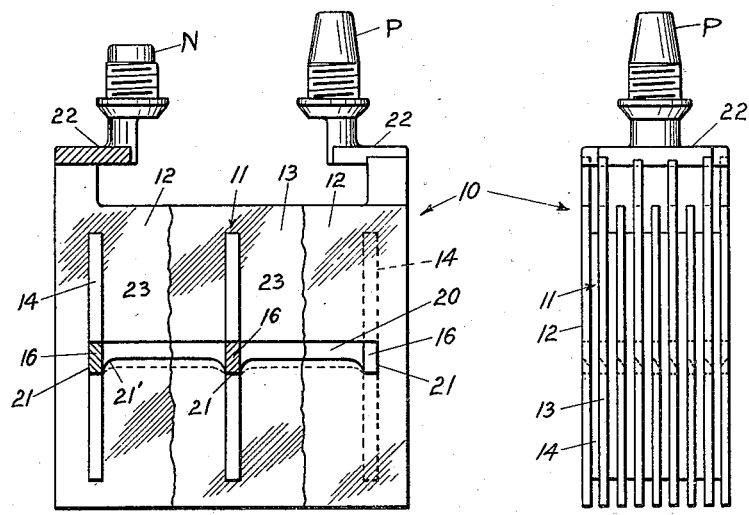
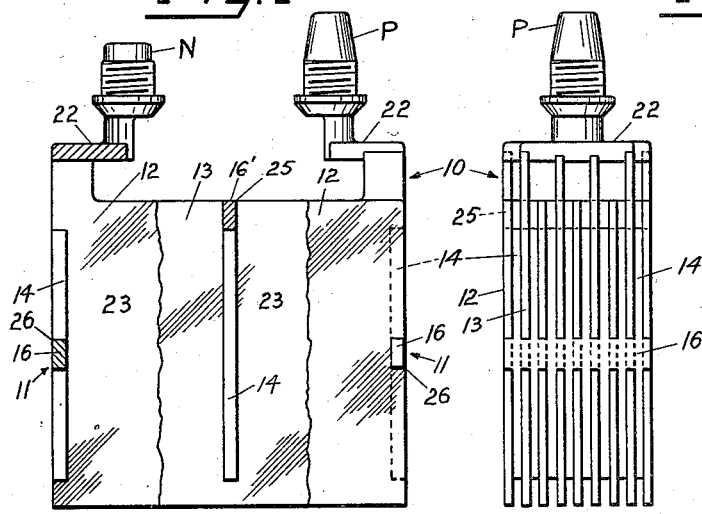
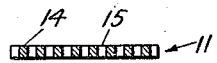
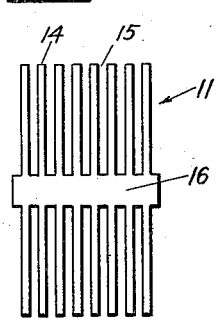
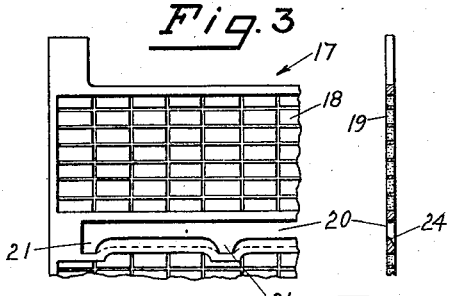
INVENTORS
Walter L. Gill
John O. Mudgett
Alexander B. Bennett
By M. C. Frank
ATTORNEY Patented June 19, 1928.

1,674,284

UNITED STATES PATENT OFFICE.

WALTER L. GILL, OF OAKLAND, AND JOHN O. MUDGETT AND ALEXANDER B. BENNETT, OF SAN JOSE, CALIFORNIA, ASSIGNORS, BY MESNE ASSIGNMENTS, TO STELLA L. BRINKMEYER, OF LOS ANGELES, CALIFORNIA.

SEPARATOR FOR THE PLATES OF STORAGE CELLS.

Application filed January 27, 1926. Serial No. 84,008.

Our invention relates broadly to storage batteries and accumulators, and has particular reference to means for separating the plates of the storage cells thereof.

Batteries of the present day for motor-propelled vehicles, lighting purposes, radio service, etc., which we are aware of, employ various means for the spacing apart of the positive and negative plates thereof, and without exception the means consists of some form of plain, corrugated or irregular separating sheets, partitions or the like, or a plurality of them. These separators are of large area and generally about equal to that of the plates, and must be more or less porous to allow the electrolyte solution to pass through them. The separators are made of an insulating material such as specially treated wood or hard rubber, and because of the varying areas of porosity it it quite difficult to maintain a voltage that is constant or near thereto.

Separators of the above character offer considerable resistance to the flow of electric current, and which resistance tends to generate internal heat and which in turn tends to expand and buckle the plates and cause short circuits with their usual injury to the battery and attendant service troubles.

In present storage cells the separators are individual elements or a plurality of them, and each separating unit is placed between a pair of plates or electrodes and thus the positive and negative groups of the cell are built up. At the tops of the groups the connectors are burned or soldered thereto, each group having its terminal. The built-up structure is then ready to be placed into the battery container and the series of plates are then pinched together by the hands, lifted, guided and lowered into place. During this operation the plates, which are all loose partitions, tend to move, slip and even shake and drop out, and also the two groups of plates tend to separate both vertically and longitudinally. In brief, the assembly is not a unit construction, is one that can not be picked up, pushed aside or handled as a unit by grasping any part thereof. The present manner of assembly is costly and very deficient in shipment, because the receiver must again replace or rearrange the separating partitions before inserting the assembly into the battery container, whether new or repair work. After the assembly is inserted in the battery solution the separators tend to float unless blocked at the top.

In our invention we seek to eliminate or minimize all the above defects and deficiencies, and to this end our invention has as one of its prime objects to produce a most inexpensive separator that will space and receive a plurality of plates and lock them together as a unit, and which unit may be handled in any manner whatsoever and at any time, with the feature in view that the unit will always remain as an integral structure.

A further object of prime importance is that, the area of the separator between each pair of plates is indeed small compared to the area of the plate surfaces, therefore there is practically no resistance to the current passing from plate to plate; this feature is conducive to a higher rate of charge and discharge of the battery, a feature much desired for the maintenance and constancy of high voltage and especially so in radio service where harmonious hearing is a factor of constant voltage, for if the voltage is unconstant frequent retuning is required because of the sensitive character of the radio apparatus.

Another object is that by our elimination of most of the heretofore separator body a very free chemical action is assured between plates, and thus the resistance and internal heat generation is minimized to the last degree.

Other objects and advantages of the invention will appear in the detailed description of the latter.

The invention consists in the construction and combination hereinafter fully described and claimed, reference being had to the accompanying drawings, in which:

Figure 1 is a side elevation of a plate assembly for a storage cell and constructed in accordance with our invention. Portions of the first three plates have been broken away to show the continuity of the separators.

Fig. 2 is an end elevation of Fig. 1.

Fig. 3 is a view similar to Fig. 1, but of a modified form of the invention and its combination in the assembly.

Fig. 4 is an end elevation of Fig. 3.

Fig. 5 is a face view of the separator employed in both types of the assemblies illustrated; and Fig. 6 is a transverse section of the separator.

Fig. 7 is a face view of a portion of one of the grids of the assembly and provided with a slot and notches to receive and coact with the separators; and Fig. 8 is an edge view of the portion of the grid with its interstices filled with active material.

Fig. 9 is a face view of a separator employed as the central separator in the assembly of Fig. 3.

Referring to the drawings we will now describe the invention in detail: The number 10 indicates the combined unit assembly or structure made possible by our invention, and as such, it is a portable unit and may be conveniently handled for shop, shelf, shipping and other purposes without any danger of its elements disassociating from the unit. Our invention includes the separator 11 and means formed in the plates 12 and 13 to jointly function to produce the unit.

The separator 11 is a member made of insulating material, and preferably that of a flat piece of suitable wood kerfed by a saw to provide a series of tongues 14 and grooves 15 formed at the ends thereof and which compose the major part of the separator. At the center of the separator is a solid portion 16 forming what we term the "key" of the separator. The tongues and grooves are uniform and diametrically opposed and give the separator the appearance of a comb. In Fig. 5 the comb-like structure has a double set of teeth and in Fig. 9 a single set.

Each plate is composed of the usual grid 17 having its interstices 18 filled with the proper active material 19 for that particular plate, that is, whether it be a positive or negative electrode.

In each plate of the assembly of Fig. 1 is a longitudinal slot 20 therethrough substantially at its middle. At each end of the slot and also at its center are formed notches 21. These notches are of a width and depth slightly greater than the width and thickness of the key 16 of the separator, and also the length of the slot between the two end notches is greater than the length of the separator for a purpose to be presently described. The slots and notches are similarly positioned in each plate for alignment purposes, and the end notches have one side rounded while the center notch has its two sides rounded as shown.

To quickly form a plate assembly for a storage cell is also one of the important objects of our invention, and we accomplish the same by the following preferred method:

The desired number of positive and negative plates are alternately arranged and mechanically positioned in alignment, then a separator 11 having the corresponding number or more of spacing tongues 14 and plate reception grooves 15 is inserted through the aligned longitudinal slots 20 and slid to the end notch 21 having the rounded side 21' and finally turned counter-clockwise to the vertical and locking position by the key 16. A similar separator is inserted for engagement for the other end notch, the rounded side thereof being adapted for turning the separator clockwise to its locking position. The length of the slot between these two positioned separators is greater than the length of the separators and enables the third separator (in the illustrated embodiment of the invention) to be inserted as before, and by reason of both sides of the central notch being rounded, the separator may be turned in either direction to the vertical locking position. Thus the two sets of plates are firmly held together as a single handable unit. To complete the sets and convert them to groups we now burn or solder the usual connector 22 to its bank of plates, one connector having the positive terminal P and the other the negative terminal N.

It is to be observed that in the completed assembly unit there are formed vertical wells 23, so to speak, between the plates and which provide for the free and efficient circulation of the electrolyte throughout the cell of the battery, and furthermore the wells permit the shed of the active material to freely precipitate between the plates and to the bottom of the container, not shown. In Fig. 8 is clearly shown at 24 that the lower side of the longitudinal slot 20 is chamfered so that no shed can rest thereon to probably form a short circuit.

In the modification of our invention of Fig. 3, we employ no longitudinal slot but have a similar notched arrangement; the central top series of notches 25 prevent longitudinal displacement and the extreme end notches 26 prevent vertical displacement. It is again to be observed that the vertical wells 23 also exist in this embodiment of our invention. By reason of the exterior placement of the separators 11 in this type of assembly, it is quicker to manufacture unit assemblies. The end separators are identical to those employed in the former assembly, while the central one 11' is of the same length but consists of but a single set of teeth insertable in the assembly from the top, the key 16' thereof engaging the aligned top notches 25.

From the foregoing description taken in connection with the accompanying drawings the advantages of the construction and method of operation will be readily understood by those skilled in the art to which the invention appertains, and while we have described the principle of operation, together with the device which we now consider to be the best embodiment thereof, we desire to have it understood that the device shown is merely illustrative and that such changes may be made, when desired, as fall within the scope of the appended claims.

Having thus described our invention, we claim as new and desire to secure by Letters Patent of the United States the following:

1. In combination with the two sets of plates of a storage cell of a plurality of plate-separating members, each of the members consisting of a key supporting a series of tongues integral therewith; each plate of the two sets of plates provided with a plurality of notches equal in number to the plate-separating members; the tongues of the members being adapted to alternately separate the respective plates in spaced relation, and the keys of the members being adapted to engage the respective notches in the plates to lock the two sets of plates together thereby sufficing to form a rigid combined unit for the cell, the said plate-separating members lying entirely within the confines of the said combined unit.

2. In combination with the two sets of plates of a storage cell of a plurality of plate-separating members, each of the members consisting of a key supporting a series of tongues integral therewith; each plate of the two sets of plates provided with a plurality of notches equal in number to the plate-separating members; the tongues of the members being adapted to alternately separate the respective plates in spaced relation, and the keys of the members being adapted to engage the respective notches in the plates to lock the two sets of plates together thereby forming a combined unit for the cell; the plurality of notches provided in each plate being a notch in the region of each end of the plate and a central notch, the notches being in alignment in the said combined unit for the purpose set forth, the said plate-separating members lying entirely within the confines of the said combined unit.

3. In combination with the two sets of plates of a storage cell of a plurality of plate-separating members, each of the members consisting of a key supporting a series of tongues integral therewith; each plate of the two sets of plates provided with a plurality of notches equal in number to the plate-separating members; the tongues of the members being adapted to alternately separate the respective plates in spaced relation, and the keys of the members being adapted to engage the respective notches in the plates to lock the two sets of plates together thereby forming a combined unit for the cell; each of said plates provided with a longitudinal slot communicating with the said notches therein, and the slot being of a length and width greater than the length and thickness of the plate-separating member so as to admit the latter and allow it to be slid therein and turned angularly so that the key thereof may engage any one of the said notches, the longitudinal slots and the notches being in alignment in the said combined unit.

4. In combination with the two sets of plates of a storage cell of a plurality of plate-separating members, each of the members consisting of a key supporting a series of tongues integral therewith; each plate of the two sets of plates provided with a plurality of notches equal in number to the plate-separating members and each notch having one of its sides rounded; the tongues of the members being adapted to alternately separate the respective plates in spaced relation, and the keys of the members being adapted to engage the respective notches in the plates to lock the two sets of plates together thereby forming a combined unit for the cell; each of said plates provided with a longitudinal slot communicating with the said notches therein, and the slot being of a length and width greater than the length and thickness of the plate-separating member so as to admit the latter and allow it to be slid therein and turned angularly over the rounded side of a notch so that the key thereof may engage any one of the said notches, the longitudinal slots and the notches being in alignment in the said combined unit.

In testimony whereof, we affix our signatures.

WALTER L. GILL.
JOHN O. MUDGETT.
ALEXANDER B. BENNETT.